May 13, 1952 W. E. RANEY 2,596,916
DRILL GRINDER
Filed Nov. 12, 1948 3 Sheets-Sheet 1

INVENTOR.
WILLIAM E. RANEY
BY
Oberlin + Limbach
ATTORNEYS.

May 13, 1952     W. E. RANEY     2,596,916
DRILL GRINDER
Filed Nov. 12, 1948     3 Sheets-Sheet 2
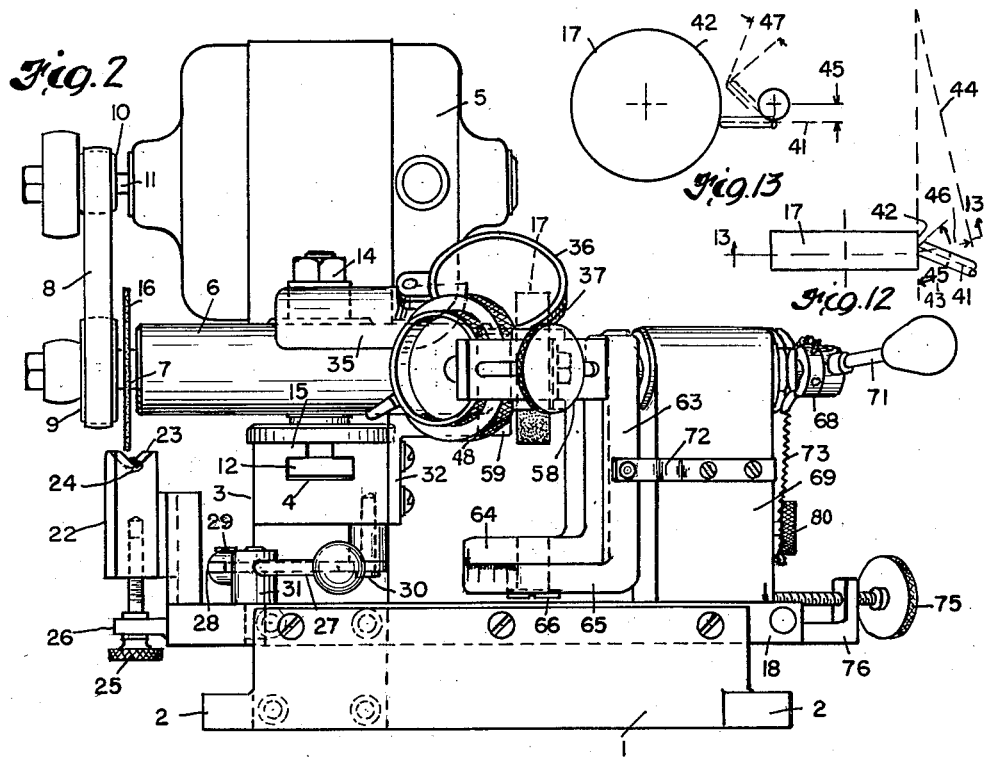
Fig. 2
Fig. 13
Fig. 12
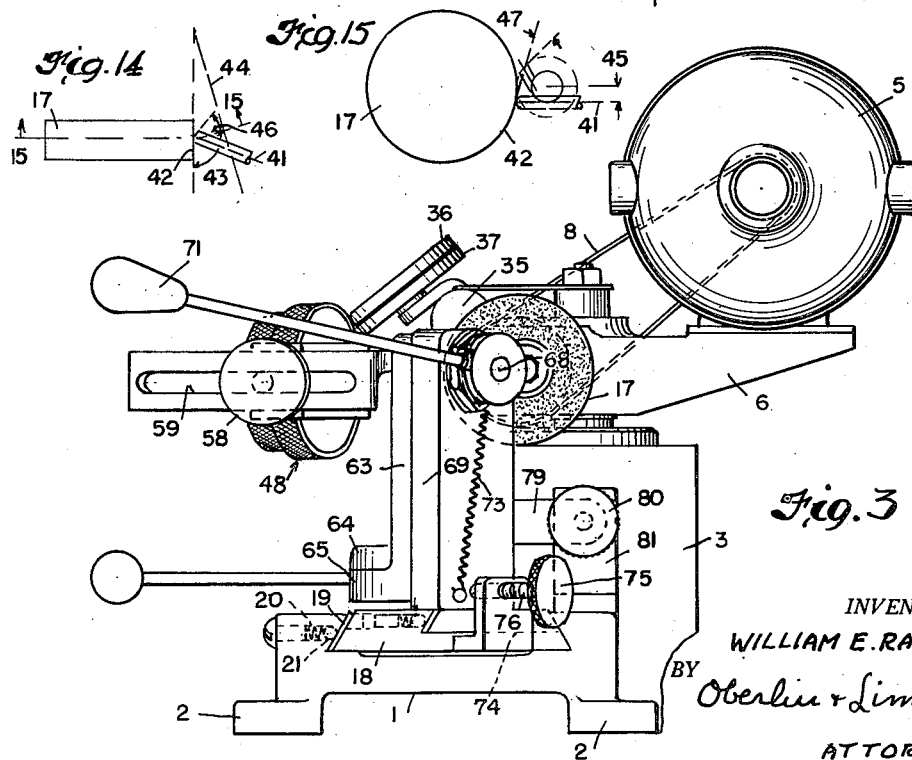
Fig. 14
Fig. 15
Fig. 3
INVENTOR.
WILLIAM E. RANEY
BY Oberlin + Limbach
ATTORNEYS.

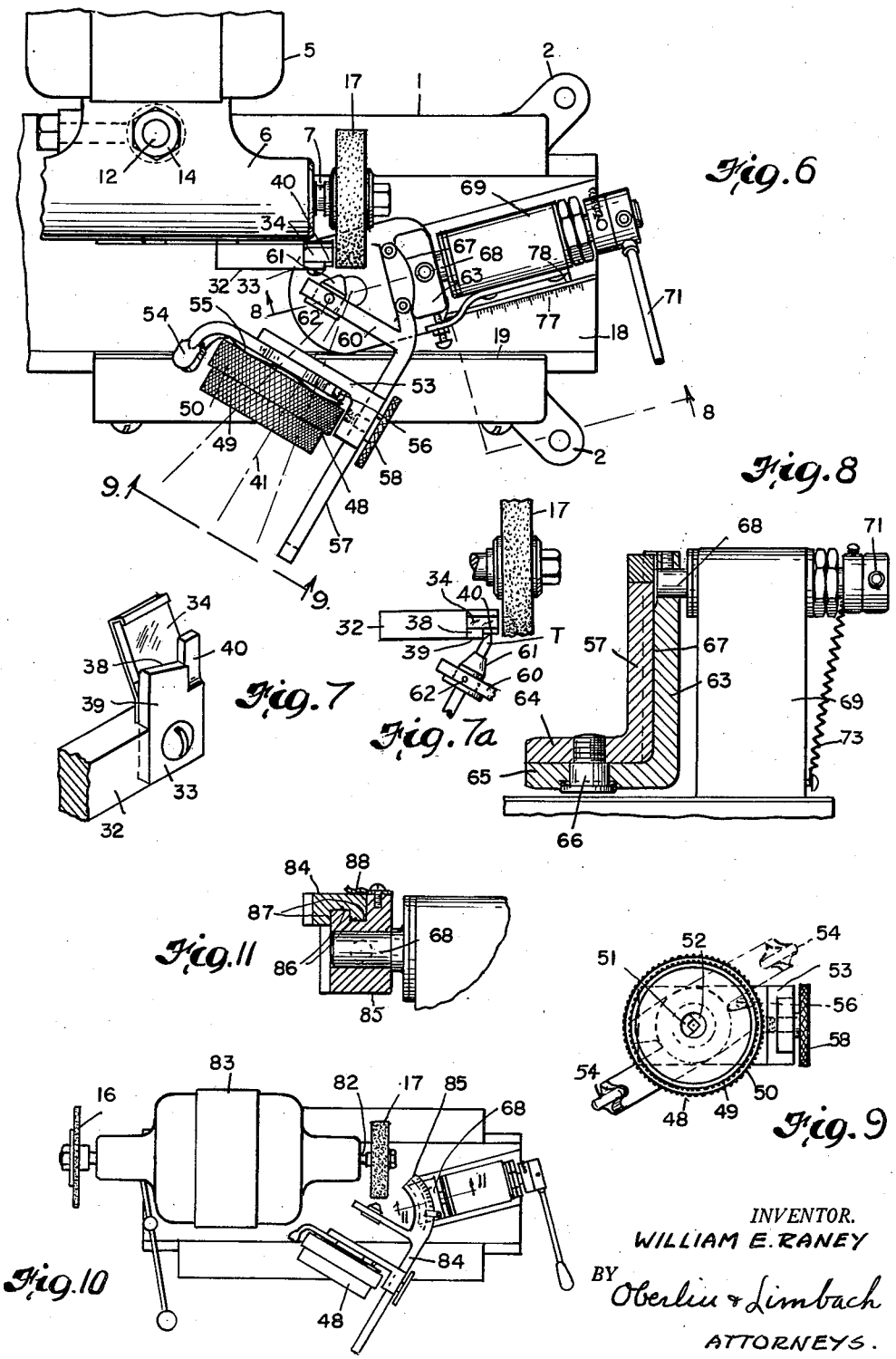

Patented May 13, 1952

2,596,916

UNITED STATES PATENT OFFICE 2,596,916

DRILL GRINDER

William E. Raney, Cleveland, Ohio

Application November 12, 1948, Serial No. 59,700

22 Claims. (Cl. 51—219)

The present improvements while relating generally as indicated to drill grinders are more particularly concerned with drill sharpeners capable of rapidly and accurately pointing drills to desired point angles and providing thereon sharp cutting lips including the necessary lip relief angles. Still more particularly the present invention has to do with grinders which are operative upon relative movement of the drills positioned therein and the grinding elements thereof to generate surfaces on the drill points which intersect the cutting lips at preselected acute angles to provide lip relief. One such grinder is disclosed in my Patent 2,411,591, dated November 26, 1946.

In general, small twist drills such as are designated by letter sizes and wire gauge sizes, viz. A to Z (.234–.413" diameter) and numbers 1 to 80 (.228–.0135" diameter), and more particularly the latter, include two helical grooves of a lead several times the diameter of the drill, of a varying depth whereby the thickness of the web between the roots of such grooves increases from the point toward the shank, thus increasing the strength of the drill, and of cross section shape such that the cutting edges or lips are straight lines and that the chips cut thereby will curl and thus readily move through the helical grooves. Another common characteristic is the decrease in the diameter of the drill from the point toward the shank to thus prevent binding. With reference to the point of the drill, the included angle thereof at the lips is ordinarily 118° although such angle may be increased or decreased in accordance with the particular material being drilled and likewise the best all-around lip relief angle is about 12°.

With the foregoing drill characteristics in mind it is apparent that a drill grinder adapted for universal usage for sharpening a variety of sizes of drills for different materials should desirably include means for thinning the webs of broken or frequently sharpened drills, and means for adjusting the point and lip relief angles. Furthermore, in order to enable rapid sharpening of a number of drills of the same size with a high degree of uniformity and accuracy, provision should be made for including a suitable gage on the grinder relative to which such drills are adapted to be positioned.

Accordingly, it is among the primary objects of this invention to provide a drill grinder fulfilling the aforesaid requirements. Additional objects listed below without regard to their relative importance are to provide:

(1) A grinder having a drill bushing adapted to firmly support a drill near the point thereof to minimize lateral distortion or bending incident to grinding and an axially shiftable chuck adapted to hold the drill by its shank regardless of the length of the drill to enable a tight grip thereon;

(2) A grinder adapted to so point a drill that the lip relief angles increase from the outer ends of the lips toward the center of the drill;

(3) A drill grinder having a unique optical system thereon including a source of illumination, a mirror and a lens or lenses for facilitating accurate positioning of a drill relative to a gage with the drill lips predeterminedly set prior to shifting of the drill to a grinding position; and (4) A drill gage as aforesaid further formed with a positioning stop for a grinding wheel dressing tool for enabling accurate dressing or truing of the wheel, such stop being so located with reference to the drill gage that a clearance is provided between the drill point and the wheel during shifting of the drill to a grinding position opposite the peripheral surface of the wheel.

Other objects and advantages will become apparent as the following description proceeds.

To the accomplishment of the foregoing and related ends, said invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 2 is a front elevation view of the grinder illustrated in Fig. 1;

Fig. 3 is an end elevation view as viewed from the righthand end of Fig. 2;

Fig. 4 is a fragmentary front elevation view with the drill chuck and bushing removed to more clearly illustrate the dual purpose drill and wheel dressing tool setting gage;

Fig. 5 is a fragmentary righthand end elevation view of the drill chuck and bushing and of the grinding wheel with the rotary drill actuating support removed;

Fig. 6 is a fragmentary top plan view similar to Fig. 1 except with the magnifying lenses and gage illuminating lamp removed to more clearly illustrate the structure thereunder;

Fig. 7 is a perspective view of the drill gage and the mirror therebehind;

Fig. 7a is a top plan view of the gage showing a diamond wheel dressing tool positioned thereagainst preparatory to truing the wheel adjacent said gage;

Fig. 8 is a cross section view taken substantially along the line 8—8, Fig. 6;

Fig. 9 is an end elevation view of the drill chuck as viewed along the line 9—9, Fig. 6;

Figs. 9a and 9b are views similar to Fig. 9 except illustrating modifications for grinding three and four-flute drills or like tools;

Fig. 10 is a top plan view of another form of grinder;

Figure 1:
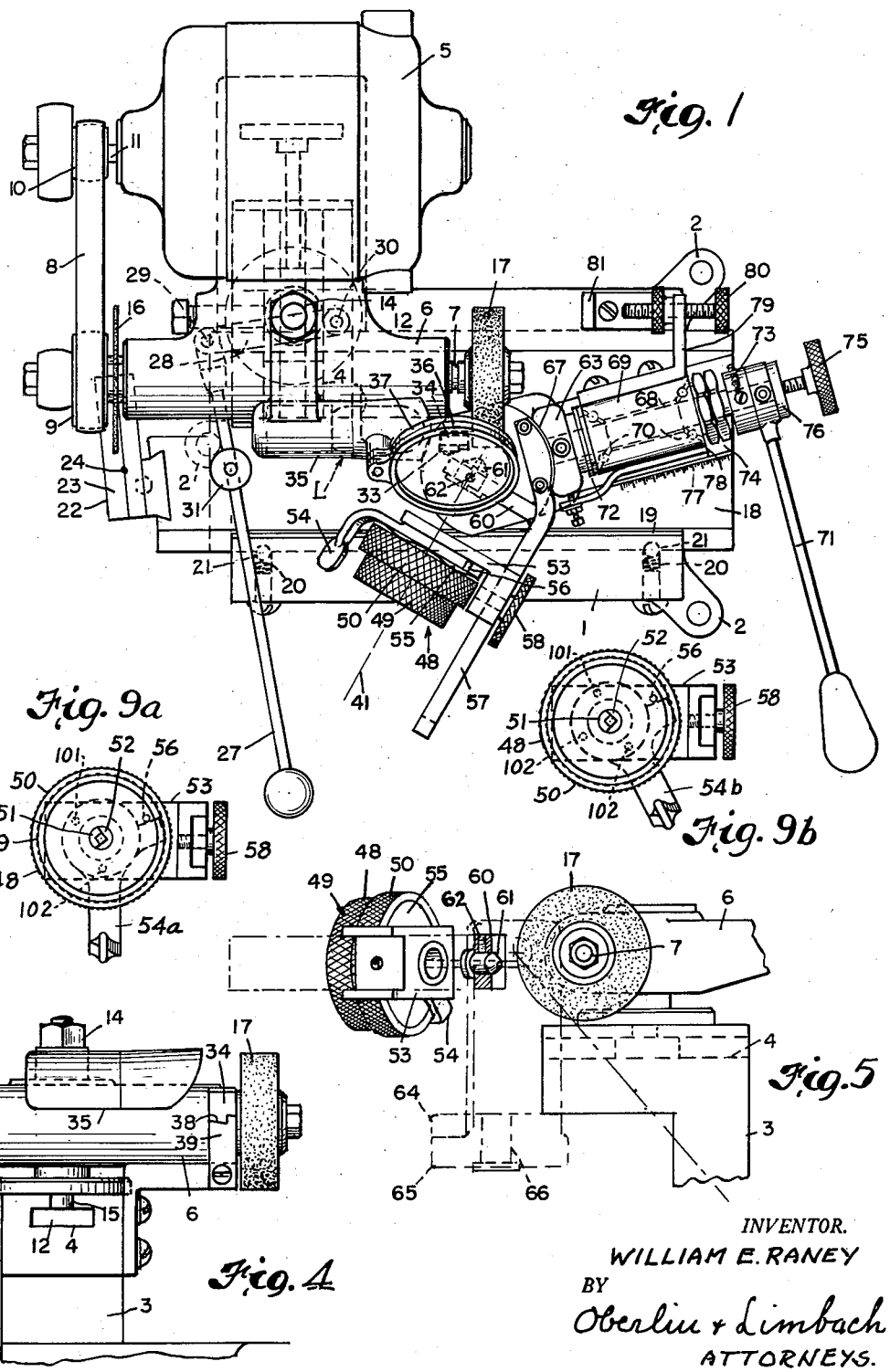
Fig. 1 is a top plan view of one embodiment of the present invention.

Fig. 11 is a detail cross section view taken substantially along the line 11—11, Fig. 10; and Figs. 12—15 are schematic diagrams illustrating the relative positions of the grinding wheel and drill for grinding different lip relief angles, Figs. 12 and 14 being top plan views, and Figs. 13 and 15 being cross section views taken substantially along the line 13—13, Fig. 12, and the line 15—15, Fig. 14, respectively.

Referring now to the drawings and first more particularly to the form of invention illustrated in Figs. 1-9 the same comprises a base 1 provided with lugs 2 through which said base may be fastened to a bench, table or other convenient support.

Projecting upwardly from said base 1 adjacent one end thereof is a standard 3 formed with a T-slot 4 at its upper end extending transversely of said base. On said standard 3 is a grinding wheel and drive assembly comprising as for example an electric motor 5, a combination motor base and spindle journal block 6, a longitudinally extending spindle 7 journalled in said block 6 and driven by belt 8 and two-speed pulleys 9 and 10 respectively keyed on spindle 7 and motor shaft 11, said block 6 having a bolt 12 extending vertically therethrough formed with a head complementary with the T-slot 4. On the threaded upper end of said bolt 12 is a nut 14 which when tightened draws the head of said bolt upward into frictional engagement with the inward projections 15 of standard 3 whereby to lock said assembly on base 1 in a desired transverse position. Non-rotatably fixed on the ends of spindle 7 are the grinding wheels 16 and 17 which are respectively operative, as will hereinafter appear, to thin the webs of drills to be sharpened and to sharpen drills.

Longitudinally slidable on base 1 is a slide member 18 having a dovetail connection with said base, such connection including gib 19 yieldably pressed against one side of the slide member dovetail as by springs 20, said gib being held longitudinally fixed on said base by means of the balls 21 which are spring-pressed into recesses formed in said gib. Said gib 19 eliminates lateral looseness of the slide member 18 in base 1 and consequent error in drill setting and grinding and also frictionally retains the slide member 18 in any of the positions to which it is adapted to be moved along said base 1.

The web thinning attachment on the grinder comprises a block 22 at one end of said slide member 18 having a vertically adjustable dovetail or like connection with the latter and formed with a V-groove 23 adapted to be positioned underneath wheel 16, such groove being disposed at an angle relative to the side faces of said wheel corresponding with the helix angle of the grooves in the drill. In the bottom of such V-groove 23 is a pin 24 which is adapted to engage one of the grooves in a drill and thus cause the drill to rotate while being moved lengthwise along such V-groove. Such rotation of the drill properly positions the web for grinding by the peripheral face of wheel 16. Vertical adjustment of said block 22 is effected as by a screw 25 having threaded engagement with said block and a rotatable but axially fixed connection with a projection 26 of said slide member 18. The vertically slidable connection between block 22 and slide member 18 preferably comprises a dovetail connection as shown.

Said slide member 18 is moved lengthwise of base 1 as by means of a lever 27 having its inner end connected to base 1 through the intermediary of a link 28 pivotally connected to said lever at 29 and to said base 1 at 30 and its intermediate portion slidably extending through an opening in a pin 31 rotatable on slide member 18 about a fixed axis normal to the opening through said pin. As evident from Fig. 1, movement of the outer end of lever 27 in opposite directions effects similar movement of slide member 18.

The drill gage and the optical system associated therewith comprises an arm 32 on standard 3 having a gage 33 attached adjacent the free end thereof and a mirror 34 mounted behind said gage, said gage being located adjacent the inner side face of wheel 17. Above said gage and mirror and mounted on the journal block 6 is a lamp housing 35 with a lamp L (see Fig. 1) therein adapted to illuminate the peripheral face of grinding wheel 17 and said gage 33 and mirror 34, and a pair of magnifying lenses 36 and 37 for enlarging the image reflected by said mirror. Said lenses are preferably pivotally supported on said block 6 whereby either or both of them may be swung clear of the gage 33 and the drill adapted to be set against said gage.

Said gage 33 as best shown in Fig. 7 is formed with a straight upper edge 38 preferably inclined as shown for a purpose which will become apparent from the ensuing description and with which edge one lip of a drill to be sharpened is adapted to be parallel or aligned, such alignment being facilitated by the projection of the image of such edge and the drill point by the mirror 34 to the lenses 36 and 37. The front face 39 of said gage 33 is parallel to the axis of wheel 17.

To use said gage 33 the point of a drill to be sharpened is first abutted against the front face 39 of said gage and then the drill is rotated about its longitudinal axis to align one of its lips with the edge 38. Thereafter, the slide member 18 is moved longitudinally of base 1 to position the drill point opposite the peripheral surface of wheel 17 whereupon the drill may be moved toward said wheel along a predetermined path to generate a surface intersecting the lip so set by gage 33 at an acute angle to thus provide a lip relief angle. Following such last-named operation the drill is rotated a predetermined angle (depending upon the number and spacing of the lips) about its longitudinal axis to position a second lip thereof for sharpening and relieving as aforesaid, it not being necessary to repeat for the second and succeeding lips the lip setting operation relative to gage 33.

Also as best shown in Figs. 7 and 7a, gage 33 is provided with a front face 40 set back a slight distance (.008" for example) from face 39 and against which face 40 a diamond dressing tool T (see Fig. 7a) or the like is adapted to be set and thence moved longitudinally of base 1 across the periphery of wheel 17 to true the latter. As said wheel 17 wears, journal block 6 is shifted forwardly and locked, whereupon movement of the wheel dressing tool as aforesaid trues said wheel and automatically provides a clearance with the drill point when the drill is moved longitudinally of base 1 from a position against face 39 of said gage to a position opposite the peripheral face of said wheel. As shown in Fig. 7a the dressing tool T is in the form of a steel rod having a diamond set in the end thereof, said rod being supported in bushing 61 adjacent the tip and in the drill chuck 48 to be described later adjacent its other end.

In the present case, the surface generated on the drill point during movement of the drill toward wheel 17 is a portion of a cone with the axis of the drill offset or eccentric to the axis of such cone, the lip relief angle for a given eccentricity being determined by the radius of the conical surface from its axis to the point of the drill as evident from a comparison of the schematic diagrams of Figs. 12 and 13 with those of Figs. 14 and 15.

As shown in Figs. 12-15, the obliqueness of the drill axis 41 relative to the peripheral face 42 of wheel 17 determines the point angle 43 between the lips of the drill. In said figures the cone axis is represented by the line 44 and the eccentricity of the drill axis 41 relative to such cone axis is represented by the dimension line 45. It is now evident that, in shifting the drill from the solid line to the dotted line position of Figs. 13 and 15 the intersection of the drill point with the wheel surface 42 will generate on the drill point a conical surface of mean radius 46, such surface providing a lip relief angle 47 in Fig. 13 and a greater lip relief angle 47 in Fig. 15 by reason of the shorter radius in Fig. 15 than in Fig. 13. Furthermore, in view of the inclined disposition of the lip (parallel to edge 38 of gage 33) the lip relief angle will be greater near the drill axis than at the outer end of the lip not only because of the shorter cone radius at such axis but because of the greater eccentricity 45 of said lip at such axis. Thus, there will be a progressive increase of the lip relief angle from the outer end of the lip toward the axis of the drill as is desirable for improved drilling characteristics.

It is to be noted that the angular disposition of the drill axis 41 relative to the cone axis 44 and wheel axis and the eccentricity 45 of the drill axis 41 relative to the cone axis 44 in effect causes the drill to partake of both an axial movement toward the wheel 17 and a rotary movement about its own axis, such combined movements producing the desired results herein enumerated.

The mechanism for holding a drill for forming the desired point angle thereon and for accomplishing the above stated generation of conical point surfaces intersecting the lips as aforesaid comprises a drill chuck 48 of any desired construction, such as illustrated in my aforesaid patent, operative upon relative rotation of the collar members 49 and 50 thereof to grip a drill extending through the jaws 51 and 52 therein which are actuated by such relative rotation of the collar members 49 and 50. Said chuck 48 is carried by a bracket 53 between which and the collar member 50 is interposed a lever 54 and a spring washer 55, the latter frictionally engaging said member 50 and lever 54 so that member 50 can be rotated independently of said lever 54 as when adjusting the drill lip relative to gage 33 and member 50 rotated in unison with lever 54 as when indexing the drill after having ground one lip thereof. For two flute drills the bracket 53 is provided with stop pin 56 thereon engaged by said lever 54 when the latter is in the solid and dotted line positions of Fig. 9, the angle between such positions being 180° as shown. In the case of drills or other tools having more than two cutting edges or lips, said lever 54 (levers 54a and 54b in Figs. 9a and 9b) will be shaped so as to be able to be rotated as for example through 240° for three lip tools and through 270° for four lip tools before engaging stop pin 56. Accordingly for such multi-lip tools intermediate 120° and 90° and 180° stops for said levers 54a and 54b may be in the nature of spring detents 101 carried in arm 53 yieldably engaging in recesses 102 formed in said levers.

Said bracket 53 is longitudinally adjustably mounted on an arm 57 extending parallel to the axis of chuck 48 and is locked in any adjusted position as by a screw 58 extending through the longitudinal slot 59 in said arm and threaded into bracket 53 to enable firm gripping of the drill chuck on the shank of any length of drill, drills of the sizes indicated varying in length from less than one inch to several inches.

For supporting the point of the drill against lateral distortion or bending during the grinding operation, said arm 57 is provided with a lateral projection 60 in which is fitted a drill bushing 61 having an aperture therethrough closely fitting on the drill and disposed near the point of the drill, said bushing being retained in place on said projection by screw 62 threaded in said projection 60 and engaged with a flatted portion of the outer surface of said bushing 61. The formation of the drill bushing 61 with such flatted portion as aforesaid obviates the necessity of maintaining concentricity between the aperture therethrough and the outer surface thereof in that said bushing is installed in only one rotative position in said projection.

Said arm 57 together with the drill chuck 48 and bushing 61 thereon are mounted for rotation about a vertical axis on a member 63 so that the drill axis 41 may be desirably adjusted with reference to a vertical plane perpendicular to the axis of the grinding wheel 17 to thus form a selected point angle on the drill to be sharpened. The adjacent horizontally disposed legs 64 and 65 of said arm 57 and member 63 are rotatable about a pin 66 through such legs frictionally holding said legs together. In order to impart stability to such rotatable connection the adjacent vertical portions are provided with interengaged cylindrical faces 67. The peripheral surfaces of the legs 64 and 65 are appropriately scribed, preferably in degrees designating the point angle, to facilitate relative adjustment to a desired drill point angle.

The upper end of member 63 is non-rotatably connected to one end of a horizontally disposed shaft 68, said shaft being rotatably supported in a slidable support member 69 by axially spaced anti-friction bearings 70. Similarly connected to the other end of said shaft 68 is an operating lever 71 by which said shaft may be rocked in said support member 69, such rocking of shaft 68 effecting a corresponding rocking of member 63, arm 57 and the drill chuck 48 and bushing 61 carried by the latter. As shown, the axis 44 of said shaft 68 is oblique relative to the axis of grinding wheel 17 and is eccentric relative to the drill axis 41 whereby to effect movement of the drill being sharpened along a predetermined path against wheel 17 as outlined above with reference to Figs. 12–15.

Said support member 69 has an arm 72 projecting therefrom into the path of member 63, said member 63 being yieldably urged against said arm 72 by the action of tension spring 73 which has its opposite ends connected to shaft 68 at a point spaced from the axis thereof and to slide 69. As apparent, upon release of lever 71 said spring effects return of the assembly carried on said support member 69 to its pregrind position.

The slide member 18 has an obliquely extending dovetail groove 74 formed therein in which the correspondingly shaped projection at the lower end of support member 69 fits, said slide member 18 and support member 69 being suitably adjusted relative to one another by a screw 75 threaded through a projection 76 of slide member 18 and rotatably and axially fixed in support member 69. Said members 18 and 69 are appropriately scribed as at 77 and 78 to indicate proper adjustments for different sizes of drills which are to have a preselected lip relief angle for example 12° or other desirable angle. This dovetail connection also preferably includes a spring actuated gib similar to that previously described and a protective cover or apron.

On support member 69 is a laterally projecting ear 79 with a bolt and lock nut assembly 80 threaded therethrough, the end of the bolt cooperating with a stop lug 81 on base 1 for positioning slide member 18 and the parts thereon in a starting position for setting a drill relative to gage 33.

Having thus described in detail the construction of one illustrative embodiment of this invention, the operation thereof will now be set forth. Preliminary adjustments to be performed are:

(1) Relatively rotate the members 57 and 63 to a selected point angle;

(2) Turn screw 75 until the mark 78 on support member 69 is in line with the mark 77 on slide 18 indicating the size of drill to be sharpened;

(3) Adjust the web thinning block 22 if necessary;

(4) Insert the proper size of bushing 61;

(5) Loosen the screw 58 and shift the chuck 48 so that the shank of the drill will be gripped thereby;

(6) Adjust bolt 80 in ear 79 so that the end of the bolt engages lug 81 when the drill chuck axis intersects the face 39 of gage 33; and (7) Dress the wheel 17 if necessary.

Said last-named operation is performed by moving the journal block 6 forwardly, clamping a dressing tool in chuck 48, positioning said tool against face 40 of gage 33, and moving said tool across the peripheral surface of wheel 17.

Following such preliminary adjustments and operations as listed above, the drill to be sharpened, if web thinning is required, is first placed in the V-groove 23 of block 22 and moved longitudinally under wheel 16 and then turned over about its axis to similarly deepen another helical groove in the drill.

With the slide member 18 in its one extreme position with bolt 80 against lug 81, the drill to be sharpened is then inserted through the drill chuck 48 and bushing 61 with the point thereof abutting face 39 of gage 33. The chuck collar members 49 and 50 are then rotated relative to one another to cause the jaws 51 and 52 thereof to move toward one another to grip the drill shank therebetween. Then, with lever 54 held against the stop pin 56, collar member 50 is rotated until one lip of the drill is parallel or aligned with the edge 38 of gage 33, such setting being assisted by the projection of an illuminated image of the edge 38 and the drill lip from the rear to the lenses 36 and 37 by means of the inclined mirror 34 disposed behind said gage. Such setting of chuck 48 and lever 54 is retained by the frictional engagement between collar 50 and spring washer 55 which is interposed between said chuck and lever.

With the drill lip thus set, lever 27 is shifted toward the right as viewed in Fig. 1 to move slide member 18 on base 1 and accordingly position the drill point opposite the peripheral surface of wheel 17. Lever 71 may then be rocked counterclockwise as viewed in Fig. 3 to move the drill point against wheel 17 whereby to generate a conical surface intersecting the drill lip at a predetermined acute angle to provide lip relief. Lever 71 is then released and lever 54 swung 180° (in the case of two-flute drills) to thus position the other lip in a grinding position opposite the periphery of wheel 17. Lever 71 is again actuated to grind the other lip relief and following the grinding of the second lip, lever 71 is released and lever 27 operated to return the slide member 18 to its starting position. Drill chuck 48 is then operated to permit removal of the sharpened drill whereupon another drill may be inserted and the operations repeated for a plurality of drills of the same diameter and length. Obviously for different sizes of drills and different lengths thereof, the grinder will have to be appropriately adjusted.

An alternative mode of operation for enabling more rapid production is to actuate lever 54 at the end of the down stroke of lever 71 whereby the return stroke effects grinding of the second lip of the drill.

The form of grinder illustrated in Figs. 10 and 11 is essentially the same as that described above except that the wheels 16 and 17 are driven directly by the shaft 82 of motor 83. A further difference in the grinder of Figs. 10 and 11 is in the rotary connection between the drill chuck carrying arm 84, and the member 85 mounted on the rock shaft 68. In this case, the connection comprises complementary interengaged arcuate grooves and arcuate projections 86 and 87 formed in arm 84 and member 85. Said arm 84 and member 85 are frictionally retained in adjusted position by a spring finger 88 which is fixed on member 85 and yieldably contacts arm 84.

Inasmuch as the operation of the modification illustrated in Figs. 10 and 11 is the same as that of Figs. 1–9 it has been deemed unnecessary to repeat the same.

From the foregoing it is now understandable that the present invention enables high speed and accurate sharpening of a variety of sizes and lengths of drills. The two specific embodiments of the invention as herein illustrated and described are, of course, to be regarded as merely typical. Furthermore, although specific reference has been made herein to the use of the present invention for grinding or sharpening drills, it will be apparent to those skilled in the art that this invention may readily be adapted for grinding other similar tools such as taps and the like. In taps, for example, the cutting edges at the point are at an angle relative to the axis of the tap, such angle varying according to the type of tap, viz. starting taps having a smaller point angle than finishing taps; and likewise it is necessary to provide back-off or relief angles on such edges.

Other modes of applying the principle of the invention may be employed, change being made as regards the details described, provided the features stated in any of the following claims, or the equivalent of such, be employed.

I therefore particularly point out and distinctly claim as my invention:

1. The combination with a rotary grinding wheel and means for driving said grinding wheel, of a gage adjacent one side of said wheel, a chuck adapted to hold a tool, and a member supporting said chuck for movement relative to said gage in a direction parallel to the axis of said wheel between positions with such tool set against said gage and disposed opposite the peripheral surface of said wheel and for movement along a predetermined path toward said wheel with such tool contacting the peripheral surface of said wheel.

2. The combination with a rotary grinding wheel and means for driving said grinding wheel, of a rotatable member mounted for rotation about an axis angularly disposed relative to the axis of said wheel, a chuck carried by said rotatable member with the axis of said chuck, and thus of a tool adapted to be held thereby, angularly disposed relative to the axes of said wheel and rotatable member and offset from the axis of said rotatable member, a gage adjacent one side of said wheel against which such tool is adapted to be positioned, and support member rotatably carrying said rotatable member and movable relative to said gage along a path parallel to the axis of said wheel for positioning such tool opposite the periphery of said wheel.

3. The combination with a rotary grinding wheel and means for driving said grinding wheel, of a gage adjacent one side of said wheel, a chuck adapted to hold a tool therein, a member supporting said chuck for movement with respect to said gage in a direction parallel to the axis of said wheel between positions with such tool set against said gage and disposed opposite the peripheral surface of said wheel and for movement along a predetermined path toward said wheel with such tool contacting the peripheral surface of said wheel, a mirror behind said gage, and a magnifying lens above said mirror enlarging the image of said gage and tool reflected by said mirror.

4. A grinder comprising a base, a slide member mounted on said base for longitudinal movement thereon, a support member mounted on said slide member for movement along a path angularly disposed relative to the path of movement of said slide member, a grinding wheel mounted on said base for rotation about an axis parallel to the path of movement of said slide member, means for driving said grinding wheel, a rotatable member mounted on said support member for rotation about an axis parallel to the path of movement of said support member, and a chuck carried by said rotatable member with the axis of said chuck and thus of a tool adapted to be held thereby, angularly disposed relative to the axes of said rotatable member and wheel and offset relative to the axis of said rotatable member.

5. A grinder comprising a base, a slide member mounted on said base for longitudinal movement thereon, a support member mounted on said slide member for movement along a path angularly disposed relative to the path of movement of said slide member, a grinding wheel mounted on said base for rotation about an axis parallel to the path of movement of said slide member, means for driving said grinding wheel, a rotatable member mounted on said support member for rotation about an axis parallel to the path of movement of said support member, and a chuck carried by said rotatable member with the axis of said chuck and thus of a tool adapted to be held thereby, angularly disposed relative to the axes of said rotatable member and wheel and offset relative to the axis of said rotatable member, said chuck being rotatably connected to said rotatable member about an axis perpendicular to the axis of the latter for varying the angular disposition of the axis of said chuck relaive to the axis of said wheel.

6. A grinder comprising a base, a slide member mounted on said base for longitudinal movement thereon, a support member mounted on said slide member for movement along a path angularly disposed relative to the path of movement of said slide member, a grinding wheel mounted on said base for rotation about an axis parallel to the path of movement of said slide member, means for driving said grinding wheel, a rotatable member mounted on said support member for rotation about an axis parallel to the path of movement of said support member, a chuck carried by said rotatable member with the axis of said chuck and thus of a tool adapted to be held thereby, angularly disposed relative to the axes of said rotatable member and wheel and offset relative to the axis of said rotatable member, and a gage on said base located adjacent one side of said wheel and against which such tool is adapted to be set prior to shifting of said tool to a position opposite the peripheral surface of said wheel responsive to movement of said slide member on said base.

7. A grinder comprising a base, a slide member mounted on said base for longitudinal movement thereon, a support member mounted on said slide member for movement along a path angularly disposed relative to the path of movement of said slide member, a grinding wheel mounted on said base for rotation about an axis parallel to the path of movement of said slide member, means for driving said grinding wheel, a rotatable member mounted on said support member for rotation about an axis parallel to the path of movement of said support member, a chuck carried by said rotatable member with the axis of said chuck and thus of a tool adapted to be held thereby, angularly disposed relative to the axes of said rotatable member and wheel and offset relative to the axis of said rotatable member, said chuck being rotatably connected to said rotatable member about an axis perpendicular to the axis of the latter for varying the angular disposition of the axis of said chuck relative to the axis of said wheel, and a gage on said base located adjacent one side of said wheel and against which such tool is adapted to be set prior to shifting of said tool to a position opposite the peripheral surface of said wheel responsive to movement of said slide member on said base.

8. A grinder comprising a base, a slide member mounted on said base for longitudinal movement thereon, a grinding wheel and drive therefor mounted on said base for transverse movement thereon relative to the axis of said wheel, and a gage on said base adjacent one side of said wheel, said gage being formed with a surface against which a tool adapted to be carried by said slide member is set prior to movement of said slide member on said base to a position with such tool opposite the peripheral surface of said wheel, said gage further being formed with another surface closer to the axis of said wheel than such first named surface relative to which said wheel is adapted to be trued to thus provide clearance with such tool when such tool is moved as aforesaid.

9. A grinder comprising a base, a slide member mounted on said base for longitudinal movement thereon, a support member mounted on said slide member for movement along a path angularly disposed relative to the path of movement of said slide member, a grinding wheel mounted on said base for rotation about an axis parallel to the path of movement of said slide member, means for driving said grinding wheel, a shaft rotatable in said support member about an axis parallel to the path of movement of said support member, means for rotating said shaft, a first member fixed to one end of said shaft, a second member rotatably mounted on said first member about an axis perpendicular to the axis of said shaft and provided with an arm projecting therefrom, and a chuck on said arm adapted to hold a tool opposite the periphery of said wheel, the axis of said chuck being offset relative to the axis of said shaft whereby rocking of said shaft effects movement of such tool against the periphery of said wheel.

10. A grinder comprising a base, a slide member mounted on said base for longitudinal movement thereon, a support member mounted on said slide member for movement along a path angularly disposed relative to the path of movement of said slide member, a grinding wheel mounted on said base for rotation about an axis parallel to the path of movement of said slide member, means for driving said grinding wheel, a shaft rotatable in said support member about an axis parallel to the path of movement of said support member, means for rotating said shaft, a first member fixed to one end of said shaft, a second member rotatably mounted on said first member about an axis perpendicular to the axis of said shaft and provided with an arm projecting therefrom, and a chuck on said arm adapted to hold a tool opposite the periphery of said wheel, the axis of said chuck being offset relative to the axis of said shaft whereby rocking of said shaft effects movement of such tool against the periphery of said wheel, said chuck being mounted for adjustment longitudinally of the arm of said second member.

11. A grinder comprising a base, a slide member mounted on said base for longitudinal movement thereon, a support member mounted on said slide member for movement along a path angularly disposed relative to the path of movement of said slide member, a grinding wheel mounted on said base for rotation about an axis parallel to the path of movement of said slide member, means for driving said grinding wheel, a shaft rotatable in said support member about an axis parallel to the path of movement of said support member, means for rotating said shaft, a first member fixed to one end of said shaft, a second member rotatably mounted on said first member about an axis perpendicular to the axis of said shaft and provided with an arm projecting therefrom, a chuck on said arm adapted to hold a tool opposite the periphery of said wheel, the axis of said chuck being offset relative to the axis of said shaft whereby rocking of said shaft effects movement of such tool against the periphery of said wheel, and a gage adjacent one side of said wheel against which such tool is adapted to be set when said slide member is moved on said base.

12. A grinder comprising a base, a slide member mounted on said base for longitudinal movement thereon, a support member mounted on said slide member for movement along a path angularly disposed relative to the path of movement of said slide member, a grinding wheel mounted on said base for rotation about an axis parallel to the path of movement of said slide member, means for driving said grinding wheel, a shaft rotatable in said support member about an axis parallel to the path of movement of said support member, means for rotating said shaft, a first member fixed to one end of said shaft, a second member rotatably mounted on said first member about an axis perpendicular to the axis of said shaft and provided with an arm projecting therefrom, a chuck on said arm adapted to hold a tool opposite the periphery of said wheel, the axis of said chuck being offset relative to the axis of said shaft whereby rocking of said shaft effects movement of such tool against the periphery of said wheel, and a gage adjacent one side of said wheel against which such tool is adapted to be set when said slide member is moved on said base, said gage including a straight edge inclined relative to the axis of said wheel and with which edge a cutting lip of such tool is adapted to be aligned prior to movement of said slide member on said base to a position with the lip of the tool opposite the periphery of said wheel.

13. The combination with a rotary grinding wheel and means for driving said grinding wheel, of a gage adjacent one side of said wheel, a chuck adapted to hold a tool, and a member supporting said chuck for movement in a direction parallel to the axis of said wheel from a position with such tool set against said gage to a position across the peripheral surface of said wheel, said gage being provided with a tool setting surface disposed radially inward of the peripheral surface of said wheel whereby said wheel is trued relative to such surface upon movement of the tool across said wheel as aforesaid, said gage being further provided with another tool setting surface disposed radially outward of such first named surface, said chuck being adapted to hold another tool which is to be ground following setting thereof against such another tool-setting surface, and means for relatively moving said chuck and wheel for engaging the latter tool with the peripheral surface of the trued wheel.

14. A grinder comprising a base, a slide member mounted on said base for longitudinal movement thereon, a support member on said slide member, a grinding wheel mounted on said base for rotation about an axis parallel to the path of movement of said slide member, means for driving said grinding wheel, a rotatable member mounted on said support for rotation about an axis angularly disposed to the axis of said wheel, a chuck carried by said rotatable member with the axis of said chuck and thus of a tool adapted to be held thereby, angularly disposed relative to the axes of said rotatable member and wheel and offset relative to the axis of said rotatable member, and means for relatively adjusting said wheel and said support member perpendicularly to the axis of said wheel.

15. A grinder comprising a base, a slide member mounted on said base for longitudinal movement thereon, a support member mounted on said slide member, a grinding wheel mounted on said base for rotation about an axis parallel to the path of movement of said slide member, means for driving said grinding wheel, a rotatable member mounted on said support for rotation about an axis angularly disposed to the axis of said wheel, a chuck carried by said rotatable member with the axis of said chuck and thus of a tool adapted to be held thereby, angularly disposed relative to the axes of said rotatable member and wheel and offset relative to the axis of said rotatable member, said chuck being rotatably connected to said rotatable member about an axis perpendicular to the axis of the latter for varying the angular disposition of the axis of said chuck relative to the axis of said wheel, and means for relatively adjusting said wheel and said support member perpendicularly to the axis of said wheel.

16. A grinder comprising a base, a slide member mounted on said base for longitudinal movement thereon, a support member mounted on said slide member, a grinding wheel mounted on said base for rotation about an axis parallel to the path of movement of said slide member, means for driving said grinding wheel, a rotatable member mounted on said support for rotation about an axis angularly disposed to the axis of said wheel, a chuck carried by said rotatable member with the axis of said chuck and thus of a tool adapted to be held thereby, angularly disposed relative to the axes of said rotatable member and wheel and offset relative to the axis of said rotatable member, a gage on said base located adjacent one side of said wheel and against which such tool is adapted to be set prior to shifting of said tool to a position opposite the peripheral surface of said wheel responsive to movement of said slide member on said base, and means for relatively adjusting said wheel and said support member perpendicularly to the axis of said wheel.

17. A grinder comprising a base, a slide member mounted on said base for longitudinal movement thereon, a support member mounted on said slide member, a grinding wheel mounted on said base for rotation about an axis parallel to the path of movement of said slide member, means for driving said grinding wheel, a rotatable member mounted on said support for rotation about an axis angularly disposed to the axis of said wheel, a chuck carried by said rotatable member with the axis of said chuck and thus of a tool adapted to be held thereby, angularly disposed relative to the axes of said rotatable member and wheel and offset relative to the axis of said rotatable member, said chuck being rotatably connected to said rotatable member about an axis perpendicular to the axis of the latter for varying the angular disposition of the axis of said chuck relative to the axis of said wheel, a gage on said base located adjacent one side of said wheel and against which such tool is adapted to be set prior to shifting of said tool to a position opposite the peripheral surface of said wheel responsive to movement of said slide member on said base, and means for relatively adjusting said wheel and said support member perpendicularly to the axis of said wheel.

18. A grinder comprising a base, a slide member mounted on said base for longitudinal movement thereon, a support member mounted on said slide member, a grinding wheel mounted on said base for rotation about an axis parallel to the path of movement of said slide member, means for driving said grinding wheel, a shaft rotatable in said support member about an axis angularly disposed to the axis of said wheel, a first member fixed to one end of said shaft, a second member rotatably mounted on said first member about an axis perpendicular to the axis of said shaft and provided with an arm projecting therefrom, and a chuck on said arm adapted to hold a tool opposite the periphery of said wheel, the axis of said chuck being offset relative to the axis of said shaft whereby rocking of said shaft effects movement of such tool against the periphery of said wheel.

19. A grinder comprising a base, a slide member mounted on said base for longitudinal movement thereon, a support member mounted on said slide member, a grinding wheel mounted on said base for rotation about an axis parallel to the path of movement of said slide member, means for driving said grinding wheel, a shaft rotatable in said support member about an axis angularly disposed to the axis of said wheel, a first member fixed to one end of said shaft, a second member rotatably mounted on said first member about an axis perpendicular to the axis of said shaft and provided with an arm projecting therefrom, and a chuck on said arm adapted to hold a tool opposite the periphery of said wheel, the axis of said chuck being offset relative to the axis of said shaft whereby rocking of said shaft effects movement of such tool against the periphery of said wheel, said chuck being mounted for adjustment longitudinally of the arm of said second member.

20. A grinder comprising a base, a slide member mounted on said base for longitudinal movement thereon, a support member mounted on said slide member, a grinding wheel mounted on said base for rotation about an axis parallel to the path of movement of said slide member, means for driving said grinding wheel, a shaft rotatable in said support member about an axis angularly disposed to the axis of said wheel, a first member fixed to one end of said shaft, a second member rotatably mounted on said first member about an axis perpendicular to the axis of said shaft and provided with an arm projecting therefrom, a chuck on said arm adapted to hold a tool opposite the periphery of said wheel, the axis of said chuck being offset relative to the axis of said shaft whereby rocking of said shaft effects movement of such tool against the periphery of said wheel, and a gage adjacent one side of said wheel against which such tool is adapted to be set when said slide member is moved on said base.

21. A grinder comprising a base, a slide member mounted on said base for longitudinal movement thereon, a support member mounted on said slide member, a grinding wheel mounted on said base for rotation about an axis parallel to the path of movement of said slide member, means for driving said grinding wheel, a shaft rotatable in said support member about an axis angularly disposed to the axis of said wheel, a first member fixed to one end of said shaft, a second member rotatably mounted on said first member about an axis perpendicular to the axis of said shaft and provided with an arm projecting therefrom, a chuck on said arm adapted to hold a tool opposite the periphery of said wheel, the axis of said chuck being offset relative to the axis of said shaft whereby rocking of said shaft effects movement of such tool against the periphery of said wheel, and a gage adjacent one side of said wheel against which such tool is adapted to be set when said slide member is moved on said base, said gage including a straight edge inclined relative to the axis of said wheel and with which edge a cutting lip of such tool is adapted to be aligned prior to movement of said slide member on said base to a position with the lip of the tool opposite the periphery of said wheel.

22. A grinder comprising a base, a slide member mounted on said base for longitudinal movement thereon, a support member mounted on said slide member, a grinding wheel mounted on said base for rotation about an axis parallel to the path of movement of said slide member, means for driving said grinding wheel, a rotatable member mounted on said support for rotation about an axis angularly disposed to the axis of said wheel, a chuck carried by said rotatable member with the axis of said chuck and thus of a tool adapted to be held thereby, angularly disposed relative to the axes of said rotatable member and wheel and offset relative to the axis of said rotatable member, said chuck being rotatably connected to said rotatable member about an axis perpendicular to the axis of the latter for varying the angular disposition of the axis of said chuck relative to the axis of said wheel.

WILLIAM E. RANEY.

REFERENCES CITED

The following references are of record in the file of this patent:

UNITED STATES PATENTS

| Number | Name | Date |
|---|---|---|
| 508,268 | Bancroft | Nov. 7, 1893 |
| 769,945 | Howland | Sept. 13, 1904 |
| 887,059 | Belden | May 12, 1908 |
| 1,093,028 | Bogart | Apr. 14, 1914 |
| 1,195,248 | Mallory | Aug. 22, 1916 |
| 1,338,039 | Hinz | Aug. 16, 1921 |
| 1,448,746 | Hunt et al. | Mar. 20, 1923 |
| 1,576,311 | Des Jardins | Mar. 9, 1926 |
| 1,917,504 | Curtis | July 11, 1933 |
| 1,989,835 | Weishampel | Feb. 5, 1935 |
| 1,993,418 | Smyser | Mar. 5, 1935 |
| 1,994,975 | Williams | Mar. 19, 1935 |
| 2,024,268 | Bausch et al. | Dec. 17, 1935 |
| 2,109,308 | Adams | Feb. 22, 1938 |
| 2,331,381 | Ekstedt | Oct. 12, 1943 |
| 2,411,591 | Raney | Nov. 26, 1946 |
| 2,511,055 | Ganz | June 13, 1950 |

FOREIGN PATENTS

| Number | Country | Date |
|---|---|---|
| 10,921 | Great Britain | Aug. 5, 1884 |
| 14,319 | Great Britain | Nov. 23, 1885 |